United States Patent
Nordness et al.

(10) Patent No.: US 9,906,595 B2
(45) Date of Patent: Feb. 27, 2018

(54) CONTENT SOURCE DISCOVERY (71) Applicant: Opanga Networks, Inc., Seattle, WA (US)

(72) Inventors: Ethan Nordness, Seattle, WA (US); Jeffrey Paul Harrang, Seattle, WA (US); John Burnette, Seattle, WA (US); Michelle Miller, Seattle, WA (US); Ben Hadorn, Seattle, WA (US); Giles Westerfield, Seattle, WA (US); Nathan Clark, Seattle, WA (US); Linh Nguyen, Seattle, WA (US); Cory Gabrielsen, Seattle, WA (US); David Gibbons, Seattle, WA (US)

(73) Assignee: OPANGA NETWORKS, INC., Seattle, WA (US)

( * ) Notice: Subject to any disclaimer, the term of this patent is extended or adjusted under 35 U.S.C. 154(b) by 23 days.

(21) Appl. No.: 14/335,826

(22) Filed: Jul. 18, 2014

(65) Prior Publication Data
US 2015/0026289 A1 Jan. 22, 2015

Related U.S. Application Data (60) Provisional application No. 61/856,423, filed on Jul. 19, 2013.

(51) Int. Cl.
*G06F 15/167* (2006.01)
*G06F 15/16* (2006.01)
(Continued)

(52) U.S. Cl.
CPC .......... *H04L 67/1097* (2013.01); *H04L 67/06* (2013.01); *H04L 67/2842* (2013.01);
(Continued)

(58) Field of Classification Search
CPC ......... H04L 63/10; H04L 63/20; H04L 63/32; H04L 63/1433; H04L 63/1441;
(Continued)

(56) References Cited

U.S. PATENT DOCUMENTS

| 8,239,915 B1 * | 8/2012 | Satish ..................... G06F 21/00 |
| | | 713/166 |
| 2006/0089965 A1 * | 4/2006 | Fontes .................... H04L 45/00 |
| | | 709/203 |

(Continued)

FOREIGN PATENT DOCUMENTS

| KR | 10-2009-0073199 A | 7/2009 |
| WO | WO 2012-050927 A2 | 4/2012 |

OTHER PUBLICATIONS

International Search Report and Written Opinion for PCT/US2014/047321, filed Jul. 18, 2014.

(Continued)

*Primary Examiner* — Farzana Huq (57) ABSTRACT

Systems and methods for discovering content sources and/or delivering content to applications resident on mobile devices are described. In embodiments, the systems and methods transmit information identifying one or more applications resident on a mobile device to a server, receive, from the server, information associated with content items available for retrieval from a content server and associated with the identified one or more applications, and cause the mobile device to retrieve at least one of the content items available for retrieval from the content server.

19 Claims, 8 Drawing Sheets

(51) Int. Cl.
*G06F 15/173* (2006.01)
*H04L 29/08* (2006.01)

(52) U.S. Cl.
CPC ...... *H04L 67/2857* (2013.01); *H04L 67/2847* (2013.01); *H04L 67/2852* (2013.01)

(58) Field of Classification Search
CPC ... H04L 67/10; H04L 67/306; H04L 67/1095; H04L 67/2833; H04L 67/2842; H04L 67/2852; H04L 67/2876; H04L 65/105; H04L 65/4084; H04L 65/4092
USPC .................................. 709/213, 217, 219, 224
See application file for complete search history.

(56) References Cited

U.S. PATENT DOCUMENTS

| | | | | |
|---|---|---|---|---|
| 2007/0220586 | A1* | 9/2007 | Salazar | G06N 3/126 726/1 |
| 2007/0244987 | A1 | 10/2007 | Pedersen et al. | |
| 2010/0088367 | A1* | 4/2010 | Brown | G06F 8/60 709/203 |
| 2010/0235528 | A1 | 9/2010 | Bocharov et al. | |
| 2012/0096071 | A1* | 4/2012 | Murphey | G06F 8/63 709/203 |
| 2012/0221697 | A1* | 8/2012 | Sainio | H04L 67/2847 709/223 |
| 2012/0272231 | A1* | 10/2012 | Kwon | G06F 8/61 717/173 |
| 2012/0311020 | A1 | 12/2012 | Brown et al. | |
| 2013/0173756 | A1* | 7/2013 | Luna | H04L 43/0876 709/219 |
| 2013/0267209 | A1* | 10/2013 | Bott | H04W 4/16 455/414.1 |
| 2013/0346965 | A1* | 12/2013 | Conlan | G06F 8/61 717/178 |
| 2015/0208409 | A1* | 7/2015 | Luna | G06F 9/5016 455/452.1 |

OTHER PUBLICATIONS

Vartiainen et al., "Auto-update: A Concept for Automatic Downloading of Web Content to a Mobile Device", Proc. of the 4th Intl. Conf. on Mobile Technology, Applications and Systems (Mobility 2007), 2007, pp. 683-689.

Extended European Search Report for EP Application No. 14827081.2, dated Feb. 24, 2017.

* cited by examiner

CONTENT SOURCE DISCOVERY

CROSS-REFERENCES TO RELATED APPLICATIONS

This application claims priority to U.S. Provisional Application No. 61/856,423, filed on Jul. 19, 2013 entitled METHOD AND SYSTEM FOR CONTENT SITE DISCOVERY, which is hereby incorporated by reference in its entirety.

BACKGROUND

Media and other content is often delivered to requesting devices (e.g., mobile or other user devices) over a network via or from network edge caches. Typically, a content provider or other network component utilizes cache controllers and associated algorithms to determine the content delivered to user devices that should be cached, such as content that is predicted to be popular, viral, and/or often requested by user devices. Therefore, when a user device requests delivery of a popular piece of content, the content provider, via the network edge cache, is able to quickly respond and deliver the requested content to the user device from the network edge cache that is proximate to the requesting user device.

In some cases, content may also be cached at the endpoints of a network, such as within local storage of a user equipment terminal device (e.g., a mobile device such as a smart phone or tablet, a laptop, and so on). Such device caching may also enable quick delivery of requested content.

Many user devices include and support a varied suite of mobile applications, or "apps," enabling users to download and install many different applications to their user devices and likely leading to a unique combination of applications on each user device. The different applications, some of which include components configured to present content to users, may have different or custom online content interfaces and retrieval/delivery protocols. Additionally, the applications may request for and receive content (e.g., video content, audio content, and so on) from various different online, networked, and/or remote content sources, such as content delivery networks (CDNs), remote content servers, remote content storage sites, and so on.

Such unique, user specific combinations of applications on user devices reflect unique application environments for every user, but an unlimited number of varying application combinations may prevent employing device caching techniques to quickly provide content to the user devices, as a typical caching client may only serve device cached content to the few applications capable of having their business logic modified to support the caching client's operations.

SUMMARY

Systems and methods for discovering content sources and/or delivering content to applications resident on mobile devices are described. In some embodiments, the systems and methods transmit information identifying one or more applications resident on a mobile device to a server, receive, from the server, information associated with content items available for retrieval from a content server and associated with the identified one or more applications, and cause the mobile device to retrieve at least one of the content items available for retrieval from the content server.

For example, the systems and methods may access a request for content transmitted from an application resident on the mobile device to the content server, intercept the accessed request for content, determine the content is stored in a local cache associated with the mobile device, and cause the mobile device to deliver the content from the local cache to the application that transmitted the request for content to the content server.

In some embodiments, the systems and methods may include an application information module that transmits information identifying one or more applications resident on a mobile device to a server, a content information module that receives, from the server, information associated with content items available for retrieval from a content server and associated with the identified one or more applications, a content retrieval module that causes the mobile device to retrieve at least one of the content items available for retrieval from the content server, and/or a content delivery module that accesses a request for content transmitted from an application resident on the mobile device to the content server, intercepts the accessed request for content, determines the content is stored in a local cache associated with the mobile device, and causes the mobile device to deliver the content from the local cache to the application that transmitted the request for content to the content server.

In some embodiments, the systems and methods intercept a request for content transmitted from an application of the mobile device to a remote content server, determine via a manifest file stored locally on the mobile device, that the content within the request for content is stored in a local cache of the mobile device, the manifest file generated by a remote policy server in communication with the mobile device and including information identifying content already delivered to the mobile device and associated with the application, and cause the mobile device to deliver the content to the application from the local cache.

DETAILED DESCRIPTION

Systems and methods for discovering content and sources of the content, and/or pre-delivering the content to user devices are described. In some embodiments, the systems and methods transmit information identifying one or more applications resident on a mobile device to a server, receive, from the server, information associated with content items available for retrieval from a content server and associated with the identified one or more applications, and cause the mobile device to retrieve at least one of the content items available for retrieval from the content server.

For example, the systems and methods may receive a manifest file from a policy server that includes a content request template and one or more uniform resource identifiers (e.g., unique content file identifiers) associated with content located at the content server and available for retrieval by the mobile device, and retrieve content associated with one of the one or more uniform resource identifiers in the manifest file via a content retrieval protocol identified by the content request template in the manifest file.

Thus, in some embodiments, the systems and methods may, without modifying the business logic of resident applications, facilitate the autonomous discovery of content sources that the resident application access to receive content, and may facilitate the pre-delivery or device caching of such content from the discovered content sources. The systems and methods may also determine a resident application is requesting content from a discovered content source during a subsequent user playback operation, and serve the content from a local cache or other local storage location that stores pre-delivered or device cached content.

Therefore, the systems and methods may identify the content available to one or more applications resident on a user device, and cause content providers to deliver the content to local storage locations before the resident applications send content requests for the identified, available, content, effectively anticipating the content requests and device caching the content before the occurrences of the content requests, among other benefits.

In the following detailed description, reference is made to the accompanying drawings, which form a part of the description. The embodiments described in the detailed description, drawings, and claims are not meant to be limiting. Other embodiments may be utilized, and other changes may be made, without departing from the spirit or scope of the subject matter presented herein. It will be understood that the aspects of the present disclosure, as generally described herein and illustrated in the drawings, may be arranged, substituted, combined, separated, and designed in a wide variety of different configurations.

The technology can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term processor refers to one or more devices, circuits, and/or processing cores configured to process data, such as computer program instructions.

A detailed description of embodiments is provided below along with accompanying figures that illustrate the principles of the technology. The technology is described in connection with such embodiments, but the technology should not be limited to any embodiment. The scope of the technology is limited only by the claims and the technology encompasses numerous alternatives, modifications and equivalents. Numerous specific details are set forth in the following description in order to provide a thorough understanding of the technology. These details are provided for the purpose of illustration and the technology may be practiced according to the claims without some or all of these specific details. For the purpose of clarity, technical material that is known in the technical fields related to the technology has not been described in detail so that the technology is not unnecessarily obscured.

Examples of the Network Environment

Figure 1A:
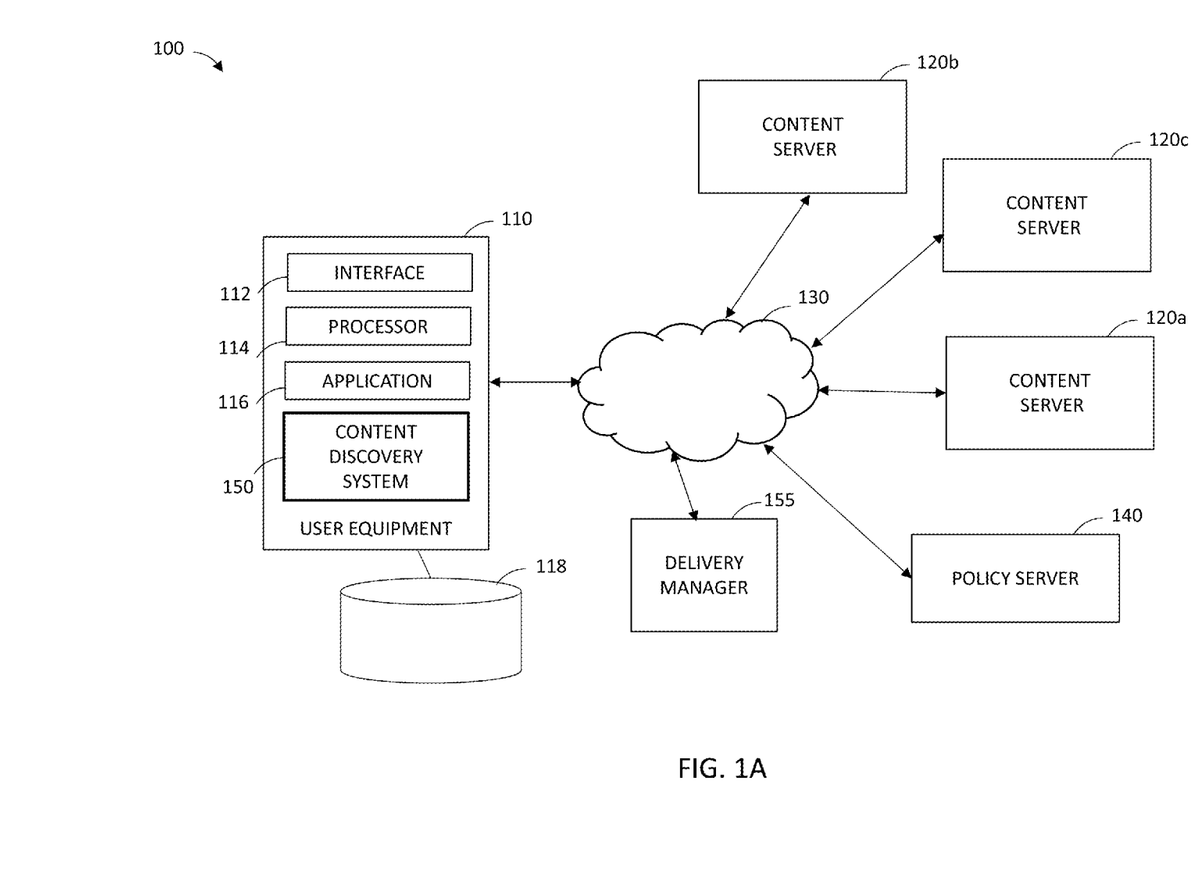
FIG. 1A is a block diagram illustrating a suitable computing environment.

FIG. 1 is a block diagram illustrating a suitable network environment 100 for content source discovery. The network environment 100 includes one or more user equipment or user devices 110, one or more content servers 120*a-c*, and a policy server 140 that communicate with one another over a data communication network 130.

Any of the machines, databases, or devices shown in FIG. 1 may be implemented in a general-purpose computer modified (e.g., configured or programmed) by software to be a special-purpose computer to perform the functions described herein for that machine, database, or device. Moreover, any two or more of the machines, databases, or devices illustrated in FIG. 1 may be combined into a single machine, and the functions described herein for any single machine, database, or device may be subdivided among multiple machines, databases, or devices.

The content servers 120*a-c* may provide a variety of different media and other content types, such as video content (e.g., movies, television shows, news programming, video clips), image content (e.g., image or picture slideshows), audio content (e.g., radio programming, music, podcasts), and so on. The content servers 120*a-c* may deliver, transfer, transport, and/or otherwise provide media files and other content to network edge caches (not shown), which may deliver, transfer, transport, and/or otherwise provide the content to requesting devices (e.g., user equipment 110*a-c*) via various media transfer protocols (e.g., Hypertext Transfer Protocol (HTTP), File Transfer Protocol (FTP), HTTP Live Streaming (HLS), HTTP Dynamic Streaming (HDS), HTTP Smooth Streaming (HSS), Dynamic Adaptive Streaming over HTTP (DASH), Real Time Streaming Protocol (RTSP), and so on).

The network 130 may be any network that enables communication between or among machines, databases, and devices. Accordingly, the network 130 may be a wide access network (WAN), wired network, a fiber network, a wireless network (e.g., a mobile or cellular network), a cellular or telecommunications network (e.g., WiFi, Global System for Mobile Communications (GSM), Universal Mobile Telecommunications System (UMTS), Long Term Evolution (LTE) network), or any suitable combination thereof. The network 130 may include one or more portions of a private network, a public network (e.g., the Internet), or any suitable combination thereof.

The user equipment 110 may include various types of user devices, such as mobile devices (e.g., laptops, smart phones, tablet computers, and so on), computing devices, set-top boxes, vehicle computing devices, gaming devices, and so on. The user equipment 110*a-c* may support and run various different operating systems, such as Microsoft® Windows®, Mac OS®, Google® Chrome®, Linux®, Unix®, or any other mobile operating system, including Symbian®, Palm®, Windows Mobile®, Google® Android®, Mobile Linux®, and so on.

The user equipment 110 may also support various components configured to request, receive, display, and/or present content to users associated with the user equipment 110. For example, the user equipment 110 may include applications 116, such as an app, browser, or other component that sends request for content to content servers 120*a-c* and presents received content to the users via various display or presentation components, such as interface 112. The user equipment 110 may also include a processor 114 and local storage or caches 118, such as a local cache or data store that stores received content (e.g., pre-delivered or device cached content) and provides the stored content to the requesting applications 112. A local cache or storage 118 may be, for example, a storage or memory component contained by the user equipment 110, a detachable storage component that may be attached to the user equipment 110, a storage device associated with a local access network (LAN) that includes the user equipment 110, and/or other storage locations or devices that store media, files, and other data for the user equipment 110 (e.g., a storage location or device that provides storage and is accessible only by a certain or associated user equipment 110).

In some embodiments, the user equipment 110 includes a content discovery system 150 that includes components configured to discover content sources and available content associated with the applications 116 resident on the user equipment 110, such as via information (e.g., a manifest file) provided by the policy server 140, which stores information associated with mobile applications, content sources, and available content, and provides a customized manifest file to the user equipment 110 that is based on the custom configuration of the applications resident on the user equipment 110.

The network environment 100 may include a delivery manager 155, which directs or otherwise manages the delivery of content between devices, such as from the content servers 120a-c to the user equipment 110, from the user equipment 110 to the content servers 120a-c, between user equipment, between content servers (e.g., from content server 120b to content server 120c), and so on. The delivery manager 155 may, when instructed, track, store, and/or provide information associated with various network delivery policies and/or protocols utilized during the delivery of content over the network 130. Although the delivery manager 155 is depicted as being separate from the content servers 120a-c, any of the content servers 120a-c and/or the policy server 140 may include some or all components of the delivery manager 150. Additionally, in some configurations, the delivery manager 155 and/or the content servers 120a-c may include some or all components of the policy server 140

In some embodiments, the delivery manager 155 directs or manages the delivery of content via a delivery policy that utilizes or uses surplus network bandwidth or surplus network capacity. A surplus of network bandwidth or network capacity may be network bandwidth or network capacity that is determined to be available idle or free) in a network in view of the total capacity of the network and/or and the total usage of the network. In some embodiments, a network provider determines the amount of surplus network capacity available in a network in view of the total capacity of the network and/or and the total usage of the network. The surplus network capacity may be determined statically or dynamically, and, therefore, a determined surplus network capacity for a network may vary substantially and/or randomly over time (e.g., during peak use periods), for long or short time scales, and/or between one service provider to another.

The surplus capacity, therefore, may be the free bandwidth or capacity between an actual and/or current usage of the bandwidth a total capacity (or, a predetermined percentage of the total capacity).

Therefore, the delivery manager 155 may direct or manage the delivery of content between content providers 120a-c, network edge caches (not shown), and user equipment 110 over various selected delivery policies or protocols that utilize free, available, idle, or otherwise surplus bandwidths or capacities of networks, such as paths or protocols that deliver data over currently underused networks that would not otherwise be in use, and/or without substantially impacting or altering the transport performance associated with other data traffic sharing the network.

Further details regarding the delivery of content using surplus network capacity may be found in commonly-assigned U.S. Pat. No. 7,500,010, issued on Mar. 3, 2009, entitled ADAPTIVE FILE DELIVERY SYSTEM AND METHOD, U.S. Pat. No. 8,589,585, issued on Nov. 19, 2013, entitled ADAPTIVE FILE DELIVERY SYSTEM AND METHOD, U.S. Published Patent Application No. 2010/0198943, filed on Apr. 15, 2010, entitled SYSTEM AND METHOD FOR PROGRESSIVE DOWNLOAD USING SURPLUS NETWORK CAPACITY, and U.S. Published Patent Application No. 2013/0124679, filed on Jan. 3, 2013, entitled SYSTEM AND METHOD FOR PROGRESSIVE DOWNLOAD WITH MINIMAL PLAY LATENCY, all of which are hereby incorporated by reference in their entirety.

Figure 1B:
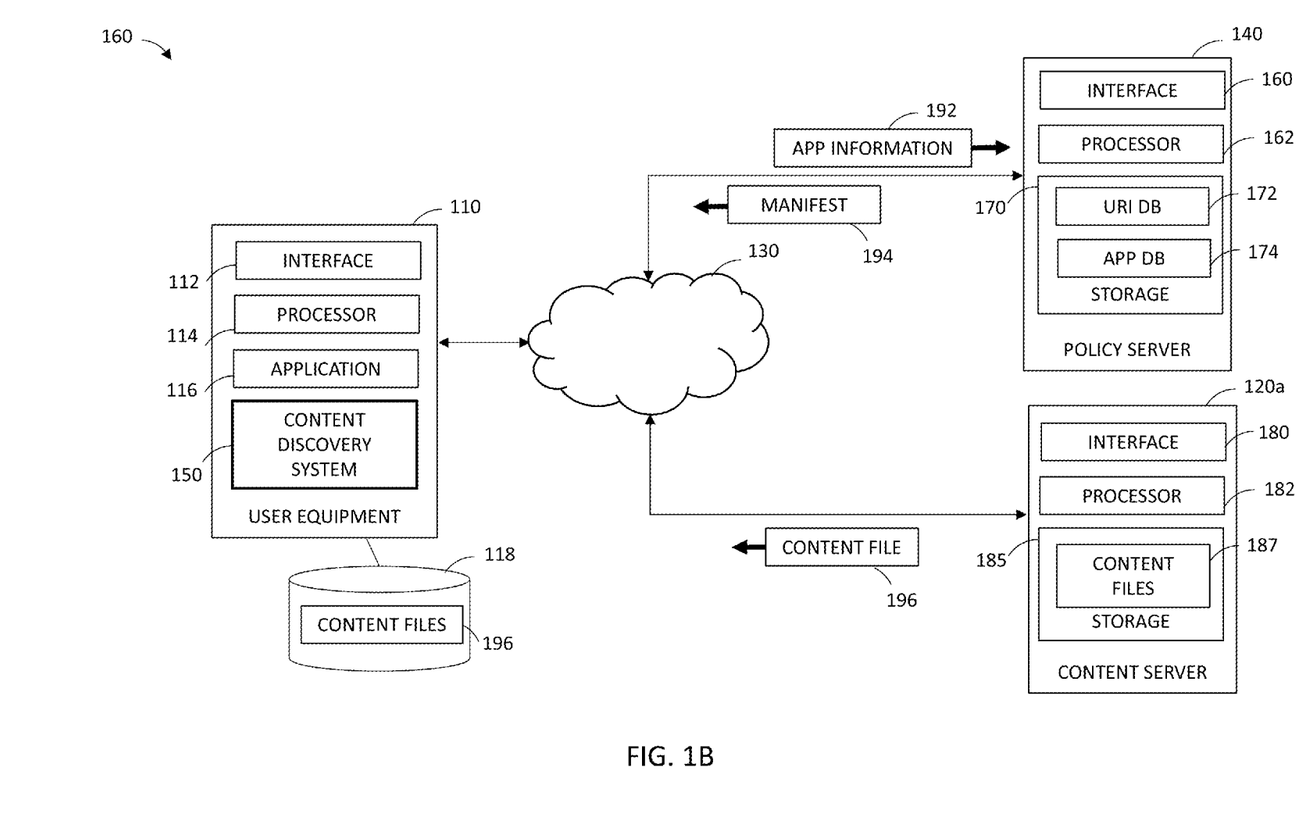
FIG. 1B is a block diagram illustrating a flow of information between user equipment, a policy server, and a content server.

FIG. 1B is a block diagram 160 illustrating a flow of information between the user equipment 110, the policy server 140, and the content server 120a, during the discovery of content sources. The user equipment 110, via the content discovery system 150, collects and stores a local application inventory list and application usage data, and provides or transmits application information 192 to the policy server 140. The user equipment 110 also receives a content manifest file 194, including universal record indicator (URI) lists from the policy server 140, which correspond to content sources associated with the applications 116 resident on the user equipment 110. Further, the user equipment 110 may retrieve content from the content server 120a and store the content in local storage 118, a portion of which may be include a content file device cache.

In some embodiments, the user equipment 110, via the content discovery system 150, accesses and intercepts requests for content originating from the resident applications 116, determines whether a content request includes a known URI (uniform resource identifier) and unique content ID, and, if known, provides the requested content from the device cache 118, when available (and, optionally, records the use of the application).

The policy server 140, which includes an interface 160 and processor 162, collects and stores in a database 170 the received application information 192 (e.g., application identification and usage reports or lists). The policy server 140 may also include an administrator user interface that enables a server administrator to view the list of applications in the application database 174, such as in an order of the number of reporting clients, and enables the server administrator to construct a URI database 172 that contains records including the application identifiers, one or more URIs specifying content available to the applications, content-request syntax templates, and other information associated with the content sources available to the applications.

The policy server 140 provides the content manifest file 194, which may include URIs associated with available content, to the content discovery system 150 located in the user equipment 110. The manifest file 194 may include, for each application identifying in the application information file 192, corresponding content URIs and application identifiers, among other information.

The content server 120a, which may include an interface 180, a processor 182, and many content files 187 located in storage 185 of the content server 120a, provides requested content files 196 to the user equipment 110. The content discovery system 150, therefore, may locally cache the received content files 196 in the local storage or cache 118 of the user equipment 110, in order to locally serve or device cache content to the applications 116 when the applications 116 request the content from the content server 120a.

Examples of Discovering Content Sources

Figure 2:
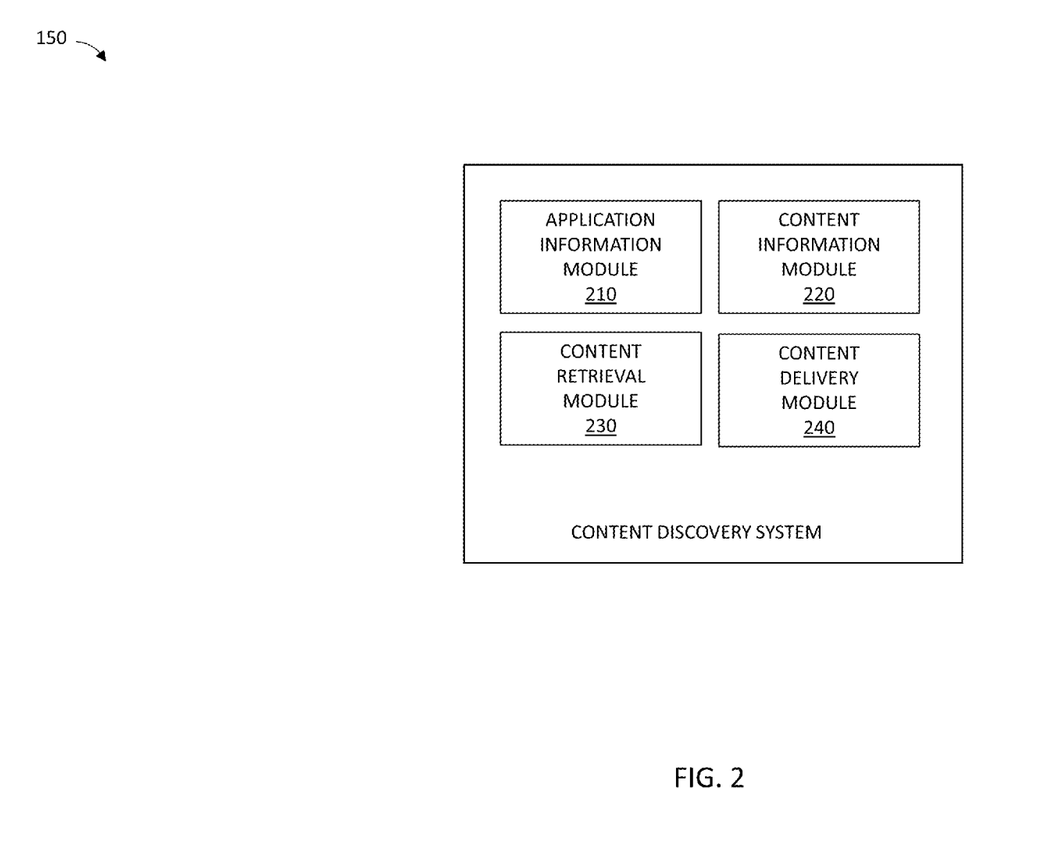
FIG. 2 is a block diagram illustrating components of a content discovery system.

As described herein, in some embodiments, the content discovery system 150 enables a mobile device or user device 110 to pre-deliver and cache into device storage content for various different applications 116 resident on the mobile device 110 in anticipation of serving the content to the applications 116 when the applications request the content from the content servers 120a-c. FIG. 2 is a block diagram illustrating the components of the content discovery system 150.

The content discovery system 150 may include one or more modules and/or components to perform one or more operations of the content discovery system 150. The modules may be hardware, software, or a combination of hardware and software, and may be executed by one or more processors. For example, the content discovery system 150 may include an application information module 210, a content information module 220, a content retrieval module 230, and a content delivery module 240.

In some embodiments, the application information module 210 is configured and/or programmed to transmit information identifying one or more applications resident on a mobile device to a server, such as the policy server 140. For example, the application information module 210 may transmit the application information file 192, which includes information identifying applications 116 resident on the mobile device 110 and application usage information identifying historical usage of the applications resident on the mobile device.

The application information module 210 may periodically inventory the applications 116 currently installed on the mobile device 110. For example, the application information module 210 may query the operating system (OS) of the mobile device or an application registration service employed by the mobile device to obtain a list of unique identifiers for the applications installed and resident on the mobile device 110. In some cases, the application information module 210 may generate the list of unique identifiers by inspecting the storage 118 of the mobile device, such as by searching for executable files having known names.

Figure 3:
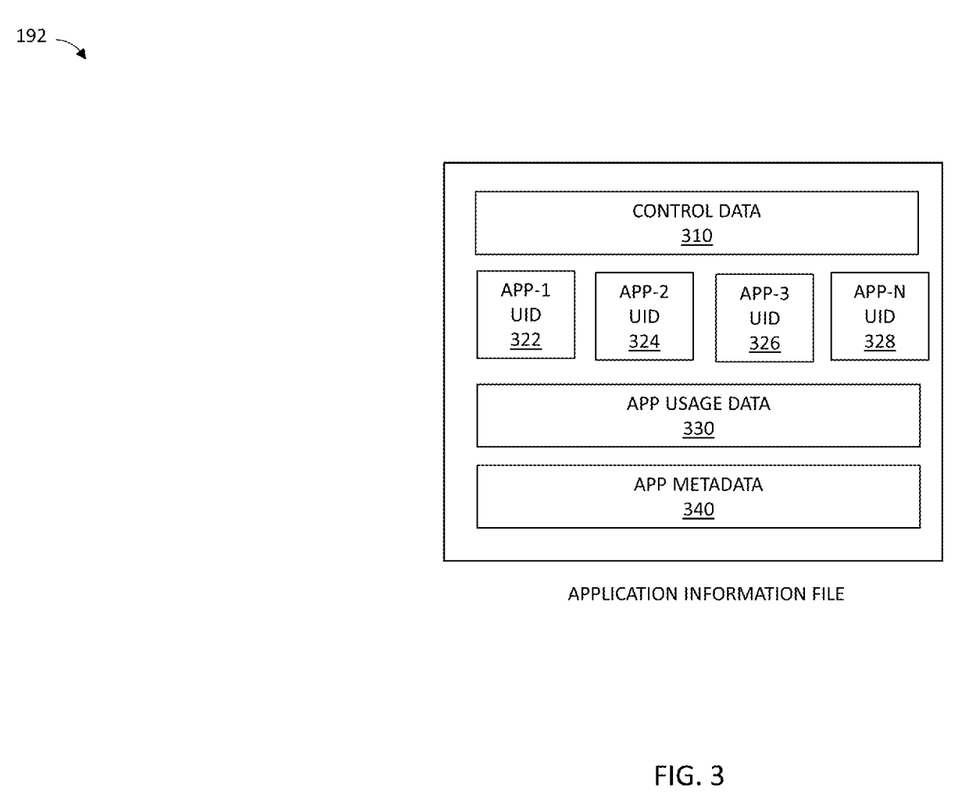
FIG. 3 is a block diagram illustrating an example application information file.

FIG. 3 is a block diagram illustrating an example application information file 192. The application information module 210 may generate an application information file 192 that includes application control data 310, application unique identifiers 322, 324, 326, and 328 for the applications 116 resident on the mobile device 110, and application metadata 340 associated with the resident applications 116, such as the dates of installation, application sizes, application versions, application build data, and so on.

The application information module 210 may also add application usage data 330 to the application information file 192. For example the application information module 210 may inspect a local application usage database, and append the application usage data 330 to the application inventory record and corresponding unique application identifiers 322, 324, 326, 328. The application usage data 330 may include, for each application 322, 3245, 326, 328, the date of last use, the number of application launches, the network delivered content volume, and/or the number of network delivered content files. The application usage data 330 may also include the type of network and operator used to deliver the content to the mobile device 110.

For example, the application usage information or data 330 may reflect various different application usage patterns, such as a list of applications, ordered from most used to least used applications, a list of all applications used within a certain or predetermined time period or time window (e.g., the previous 24 hours, the previous week, the previous month, and so on), a list of applications recently used, a list of applications used over a certain threshold number of instances within a certain time period, and/or other usage patterns or usage trends.

Referring back to FIG. 2, in some embodiments, the content information module 220 is configured and/or programmed to receive, from the server, information associated with content items available for retrieval from a content server and associated with the identified one or more applications. For example, the content information module 220 may receive the content manifest file 194 from the policy server 140. As described herein, the content manifest file, or manifest file 194, may include a content request template and one or more uniform resource identifiers associated with content or content feeds located at the content server and available for retrieval by the mobile device.

The policy server 140 receives the application information files 192 and stores the files 192 in the application information database 174. In some cases, the collection process may be spread out over time, as the policy server 140 receives files or reports 192 from different clients in a serial fashion. For example, the policy server 140 may initially collect files 192, and thereafter once every N days (e.g., 30 days) after starting with no prior recorded operating history. Periodically, a server administer may launch the user interface 160 to examine the collected records stored in the local application information database 174.

By examining the collected application information files 192, the policy server 140, via a running algorithm or via an administrator, may determine a relative popularity or other patterns associated with a particular or certain application in a population of reporting clients. In some cases, the algorithm or administrator may focus on certain types of groups of applications, such as applications known to heavily use the network 130 for media file delivery, the most popular applications, the applications known to consume the greatest amount of content, and/or other similar criteria or combinations of criteria.

In some embodiments, the algorithm or administrator may distinguish and select distinct groups of applications for reporting clients sharing certain applications, such as applications requiring or requesting content access authorization from users of the applications.

For each selected application, an administrator manually configures the business logic that may be used by an automated server process to periodically receive updates of the content items available from one or more content feeds associated with the application. A content feed may be any source of online content available to multiple users for download or delivery. The administrator may determine how the application determines and retrieves new available content, such as by obtaining implementation details from the application developer, by examining packet traffic to and from the application, and so on.

In some cases, applications have distinct and custom means for content awareness and retrieval, and their associated business logic may be specific to the application, content type, and/or version. In some cases, the content awareness/retrieval process of the application may follow established standards, such as Rich Site Summary (RSS) or ATOM (IETF RFC 4287).

Once the feed business logic is configured, the policy server 140, via the administrator, activates a process to generate (or, at times, to update) the content manifest files 194, which are specific and configured for each application. In generating the manifest files 194, the policy server 140 communicates with the content servers 120*a-c* associated with the content feeds, obtaining a current list of content item URIs for content available to the applications. The policy server 140, in some cases, triggers communication with the content servers 120*a-c* by periodic requests (e.g., using a synchronous timer once per hour), by pushing requests, by manual requests, by automated requests, and so on.

Often, a list of available content items received from the content servers 120*a-c* is large, and the policy server 140 may apply rules or thresholds to limit the manifest file 194 to a maximum size limit, a category of content, a type of content, to predetermined file sizes, and so on. In addition, the policy server 140 may apply compression techniques to compress the manifest file (e.g., via lossless file compression techniques) in order to reduce the transport size of the manifest file 194.

Once the manifest file 194 has been generated, the policy server 140 communicates the file to the mobile devices 110, such as via serial or broadcast/multicast communications. In some cases, the delivery of the manifest file 194 may be triggered by a client request or by a server notification that a new manifest file 194 is available. In other cases, the content discovery system 150 communicates a current manifest file 194 status known to the content discovery system 150, and if the policy server 140 determines that no update is available, the policy server 140 does not provide a manifest file 194 in response to a request (e.g., a no-change notification may be provided).

As described herein, the manifest file 194 provides information to the content discovery system 150 that identifies the content files available to user applications installed on the specific mobile device 110 that includes the content discovery system 150, as well as a content request template that enables the content discovery system 150 to determine when content requested by the applications 116 resident on the mobile device 110 may have been previously cached (or is otherwise deemed redundant or unneeded) by the content discovery system 150 to the mobile device 110.

Figure 4A:
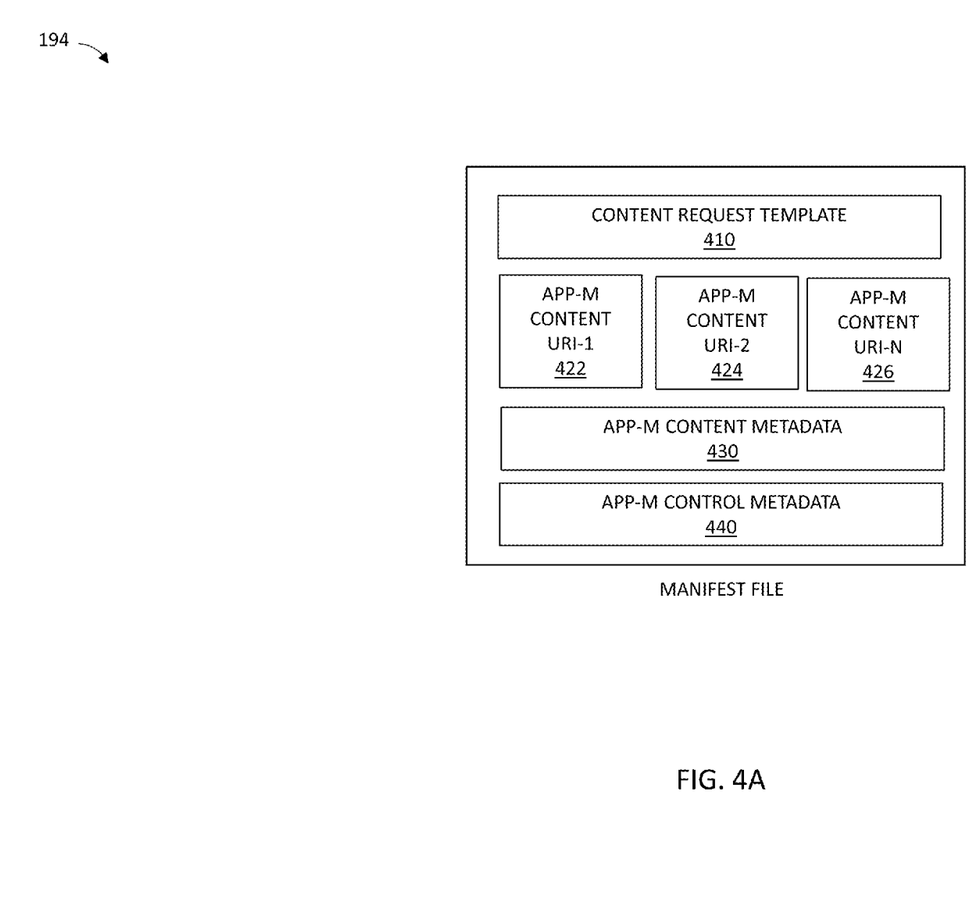
FIGS. 4A-4B are block diagrams illustrating example manifest files.
Figure 4B:
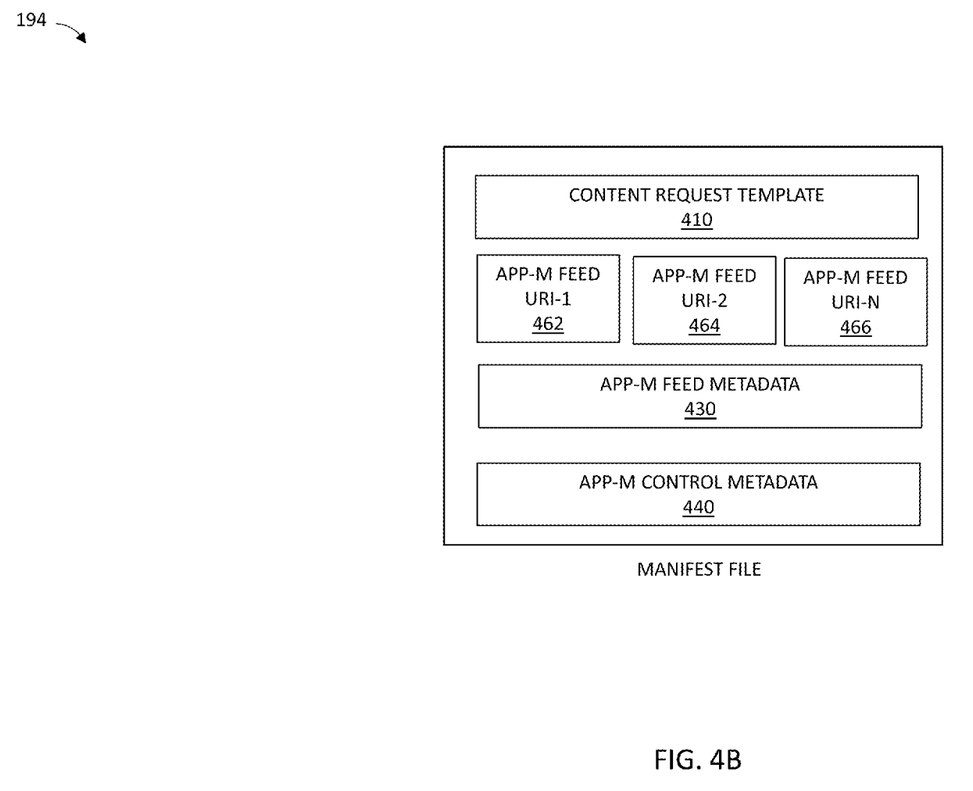

FIGS. 4A-4B are block diagrams illustrating example manifest files 194. Referring to FIG. 4A, the manifest file 194 includes a set of data records (one per application) with various sub fields for specifying what current content is available to the app from the remote content servers 120*a-c*. The manifest file 194 also includes the content request template 410, which specifies, for example, a searchable request string pattern used by applications communicating with the remote content servers 120*a-c*.

In some embodiments, the content request template 410 is the protocol (e.g. HTTP) command (with wild-card characters indicating optional or non-static portions of the command) used to request a content file download to the application, such as for video playback while downloading (e.g., streaming media playback). In some embodiments, the request string pattern may include a sequence of request/response pairs between client and content server, such as in cases where a hierarchy of content server message exchanges is required to retrieve requested content.

In some embodiments, the content discovery system 150 may utilize the content request template 410 to form content file request commands, in order to pre-cache content onto the user equipment 110, and/or to parse outgoing content request commands from applications running on the user equipment, and identify unique resource identifiers for the requested content. For example, a content request template 410 may be applied to the payloads of HTTP GET requests to parse commands that may contain strings of the generic format:

```
{
  "host": "example.com"
  "path": "[?&]video_id=([^&]*)"
}.
```

In this example, the regular expression may be applied to the path element of an outgoing HTTP request for the particular host. The unique video id value is matched and extracted, and the content discovery system 150 uses it to determine whether the requested content file is already, or at least partially, pre-cached locally on the user equipment 118.

The manifest file 194 also includes locator record specifications 422, 424, 426 for content that is currently available for download by the application, as well as content metadata 430, such as content file size, content category keywords, content posting time, content text description or images, video/audio resolution, content popularity, file format and other information intended to help distinguish which content should be pre-cached to the mobile device 110, and/or control data 440, such as server software version information, manifest creation time, expected next manifest creation time, and/or other information intended to assist in managing the manifest distribution process.

In some embodiments, the content discovery system 150 utilizes the content uniform resource indicators 422, 424, 426 to identify and pre-cache content files on to the user equipment 110.

For example, a list of content uniform resource indicators may be formatted in JSON language syntax:

```
[
  "item": { "url": http://example.com/content1/
    videoplayback?video_id=55455 }
  "item": { "url": http://example.com/content2/
    videoplayback?video_id=99677 }
  ...
]
```

The content discovery system may use the content request template 410 to extract one or more video unique identifiers from the list (e.g. 55455, 99677, etc.) and create a database of identifiers corresponding to content files. The content discovery system 150 pre-caches the selected content files, using the URL's in the list to retrieve them with HTTP GET commands. The content identifier database may also be used during content request interception to determine whether the requested content is pre-cached or not cached.

Referring to FIG. 4B, in some embodiments, the manifest file 194 may specify a feed directory or folder where content may be available, rather than the actual individual file items associated with a feed directory or folder. For example, the data records 462, 464, 466 in the manifest file 194 may include information identifying the content feeds associated with content available to the application. Thus, the content discovery system 150, using the manifest file 194 of FIG.

4B, may query a feed (e.g., via a directory command) to discover and process available content items.

For example, a list of content feeds may be retrieved from the manifest formatted in JSON language syntax:

```
{
    "url": "http://example.com/feed"
    "type": "text/json"
    "urlJSONPath": "$.videoItems[:].url"
}.
```

In this example, the content discovery system retrieves the feed URL (e.g. http://example.com/feed), returning for example:

```
{
    "videoItems": [
        { "url": "http://example.com/content2/
            videoplayback?video_id=55455" },
        { "url": "http://example.com/content2/
            videoplayback?video_id=99677" },
        { "url": "http://example.com/content2/
            videoplayback?video_id=13324" }
    ]
}.
```

The retrieved feed list may then be parsed via the "urlJSONPath" search specification to generate a JSON item list similar to the lists described herein.

Although the JSON language is illustrated in these examples, other equivalent alternatives could be used, including XML (with XPath), YAML, or Google Protocol Buffers.

In some embodiments, the policy server 140 may present a user of mobile device 110 with a user interface for manually creating, editing or appending to the content manifest file 194. The policy server 140 may enable the user to create custom feeds or content specifications and request templates for their specific device 110, among other customizations.

Referring back to FIG. 2, in some embodiments, the content retrieval module 230 is configured and/or programmed to cause the mobile device to retrieve at least one of the content items available for retrieval from the content server. For example, the content retrieval module 230 may retrieve a content item associated with one of the one or more uniform resource identifiers retrieved from the manifest file 194 and via a content retrieval protocol identified by the content request template 410 in the manifest file. As described herein, the content request template 410 may define a content retrieval protocol for the content source or server 120a-c.

In some embodiments, the content delivery module 240 is configured and/or programmed to cause delivery of content that is then locally stored for access by a requesting application. For example, the content delivery module 240 may access a request for content transmitted from an application 116 resident on the mobile device 110 to the content server 120a-c, intercept the request for content, determine the content 196 is stored in a local cache 118 associated with the mobile device 110, cause the mobile device 110 to deliver the content 196 from the local cache 118 to the application 116 that transmitted the request for content to the content server 120a-c.

In some embodiments, the content delivery module 240 may update stored application usage data for the one or more applications 116 resident on the mobile device 110 based on delivery of the content to the application 116 that transmitted the request for content to the content server 120a-c.

The content retrieval module 230 receives the manifest file 194 originally transmitted by the policy server 140, and determines which content items are to be pre-delivered, or pre-cached fully or in part to the mobile device 110, using the content URIs 422, 424, 426 in the manifest file 194. For example, the content retrieval module 230 may determine content to be pre-delivered to be some or all content that is recent or new created or posted, via previous usage or download history, and so on. Using the received manifest file 194, the content retrieval module 230 selects a content item, and retrieves the content item using the URI to request the delivery (such as via surplus capacity over the network 130).

In some embodiments, the content delivery module 240, receives or accesses a content fetch request, such as when a user of the mobile device 110 opens the application 116 and uses the application user interface to select a content item for playback, and intercepts the content fetch request by comparing the content request with the content request template 410 previously delivered within the manifest file 194. When the content request matches the content request template 410, the content delivery module 240 extracts the content item specific portions of the content request to determine the content UID. Further details regarding the interception of content requests may be found in commonly-assigned and co-pending application Ser. No. 14/175,995, filed on Feb. 7, 2014 and entitled TRANSPARENT MEDIA DELIVERY AND PROXY, which is hereby incorporated by reference in its entirety.

Using the extracted content UID from the file request, the content delivery module 240 determines, via a file system search, whether the content item is resident in the local storage 118. If the content item is found, then the content delivery module 240 may serve the content to the application 116, else the content delivery module 240 may allow the content request to proceed unmodified to the remote content servers 120a-c for delivery, or otherwise manage the delivery of the content to the application 116.

Figure 5:
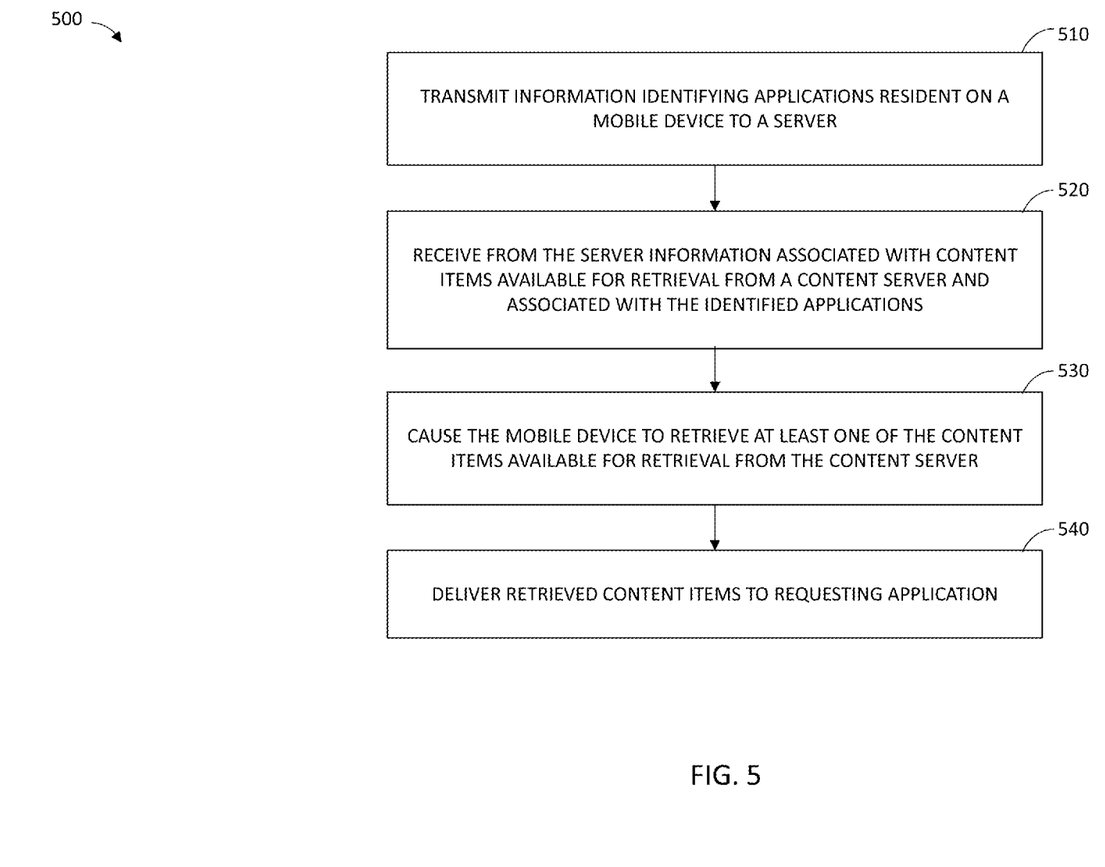
FIG. 5 is a flow diagram illustrating a method for content site discovery.

As described herein, the content discovery system 150 may perform various different methods, processes, and/or algorithms when discovering content sources for application resident on a mobile device. FIG. 5 is a flow diagram illustrating a method 500 for content source discovery. The method 500 may be performed by the content discovery system 150 and, accordingly, is described herein merely by way of reference thereto. It will be appreciated that the method 500 may be performed on any suitable hardware.

In operation 510, the content discovery system 150 transmits information identifying one or more applications resident on a mobile device to a server. For example, the application information module 210 may transmit the application information file 192, which includes information identifying applications 116 resident on the mobile device 110 and application usage information identifying historical usage of the applications resident on the mobile device.

In operation 520, the content discovery system 150 receives, from the server, information associated with content items available for retrieval from a content server and associated with the identified one or more applications. For example, the content information module 220 may receive the content manifest file 194 from the policy server 140. As described herein, the content manifest file, or manifest file 194, may include the content request template 410 and one or more uniform resource identifiers 422, 424, 426, associated with content or content feeds located at the content servers 120*a-c* and available for retrieval by the mobile device 110.

In operation 530, the content discovery system 150 causes the mobile device to retrieve at least one of the content items available for retrieval from the content server. For example, the content retrieval module 230 may retrieve a content item associated with one of the one or more uniform resource identifiers in the manifest file 194 and via a content retrieval protocol identified by the content request template 410 in the manifest file. As described herein, the content request template 410 may define a content retrieval protocol for the content source or server 120*a-c*.

In some cases the content discovery system 150 may apply local policies to determine or select a subset of content for retrieval from the content server. For example, the content discovery system 150 may select a limited or selected number or amount of content items, based on a total amount limit of content that can be pre-cached on the device storage 118, based on a total amount limit to download to the device, and so on.

In operation 540, the content discovery system 150 delivers the retrieved content items to the requesting application. For example, the content delivery module 240 may access a request for content transmitted from an application 116 resident on the mobile device 110 to the content server 120*a-c*, intercept the accessed request for content, determine the content 196 is stored in a local cache 118 associated with the mobile device 110, cause the mobile device 110 to deliver the content 196 from the local cache 118 to the application 116 that transmitted the request for content to the content server 120*a-c*.

Figure 6:
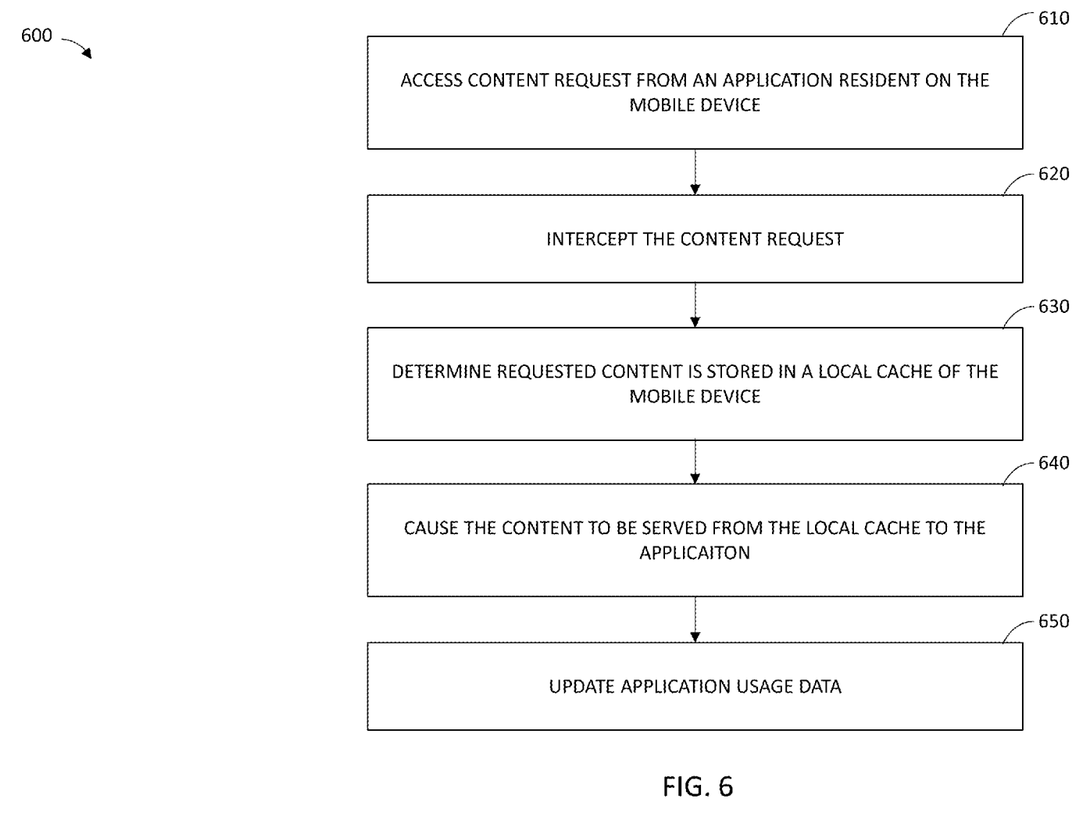
FIG. 6 is a flow diagram illustrating a method for delivering content to an application resident on a mobile device.

For example, FIG. 6 is a flow diagram illustrating a method 600 for delivering content to an application resident on a mobile device. The method 600 may be performed by the content discovery system 150 and, accordingly, is described herein merely by way of reference thereto. It will be appreciated that the method 600 may be performed on any suitable hardware.

In operation 610, the content discovery system 150 accesses a request for content transmitted from an application resident on the mobile device to the content server. For example, the content discovery system 150 may access a request from an application to playback a video clip via a video content application.

In operation 620, the content discovery system 150 intercepts the accessed request for content, and in operation 630, determines the content is stored in a local cache 118 associated with the mobile device. For example, the content discovery system 150 reviews a stored manifest file 194, and determines that the selected video clip is stored in local cache 118 of the mobile device 110.

In operation 640, the content discovery system 150 causes the mobile device to deliver the content from the local cache to the application that transmitted the request for content to the content server. For example, the content discovery system 150 enables the video player of the mobile device 110 to play the locally cached video clip.

In operation 650, the content discovery system 150 updates application usage data for the one or more applications resident on the mobile device based on delivery of the content to the application that transmitted the request for content to the content server.

Thus, in some embodiments, the content discovery system 150 utilizes a downloaded or stored manifest file 194 to intercept a request for content transmitted from an application of the mobile device to a remote content server, determine, via the manifest file 194 stored locally on the mobile device, that the content within the request for content is stored in a local cache 118 of the mobile device, and cause the mobile device to deliver the content to the application from the local cache 118. In cases where the content is not stored in the local cache 118, the content discovery system 150 may forward the request to external content servers 120*a-c*, which provide the content to the mobile device.

As an example, a consumer or user of a smart phone has downloaded many unmodified applications via an online app store. The systems and methods periodically detect and track the installed applications, send application information to a remote server, and receive lists of online content available for the installed applications. The user opens one of the applications and selects a video clip for playback. The systems and methods, utilizing the lists of online content available for the opened application, have already caused delivery of the video clip (partially or fully) to local storage, and caused the application to play the video clip entirely or beginning with the local copy of the video clip content that is stored in the local cache. Of course, other example scenarios are possible.

Although aspects of the present technology have been described with respect to specific examples, embodiments of the present technology are not limited by these examples. For example, persons of skill in the art will recognize that pre-delivering content to user devices may be performed according to various other algorithms and processes without departing from the scope or spirit of the present technology.

What is claimed is:

1. A method, comprising:
    transmitting, from a mobile device, information including a list identifying applications resident on the mobile device to a first server;
    receiving, from the first server, a manifest file that indicates content items available for retrieval from a second server and associated with one or more of the identified applications, the manifest file including one or more content request templates corresponding to the one or more identified applications, respectively, each of the one or more content request templates being a template of a request by the respective application for content from the second server; and
    causing the mobile device to retrieve at least one of the content items available for retrieval from the second server using the one or more content request templates, the at least one content item available for retrieval being available for delivery or pre-delivery from the second server;
    accessing a request for content transmitted from one of the applications resident on the mobile device to the second server;
    intercepting the accessed request for content;
    deriving identification information about the requested content from the request for content using the content request template corresponding to the application resident on the mobile device;
    comparing the identification information about the requested content to content stored in a local cache associated with the mobile device;
    determining at least a portion of the content is stored in the local cache; and causing the mobile device to deliver the at least portion of the content from the local cache to the application that transmitted the request for content to the second server.

2. The method of claim 1, wherein receiving a manifest file that indicates content items available for retrieval includes receiving a manifest file including one or more uniform resource identifiers associated with content located at the second server and available for retrieval by the mobile device; and wherein causing the mobile device to retrieve at least one of the content items available for retrieval from the second server includes causing the mobile device to retrieve a content item associated with one of the one or more uniform resource identifiers in the manifest file via a content retrieval protocol identified by the content request template in the manifest file.

3. The method of claim 1, wherein receiving a manifest file that indicates content items available for retrieval includes receiving a manifest file including one or more uniform resource identifiers associated with content feeds located at the second server and available for retrieval by the mobile device; and wherein causing the mobile device to retrieve at least one of the content items available for retrieval from the content server includes causing the mobile device to retrieve a content feed associated with one of the one or more uniform resource identifiers in the manifest file via a content retrieval protocol identified by the content request template in the manifest file.

4. The method of claim 1, wherein transmitting, from a mobile device, information including a list identifying applications resident on the mobile device to a first server includes transmitting, from the mobile device, an application information file to the first server, the application information file including information identifying applications resident on the mobile device and application usage information identifying historical usage of the applications resident on the mobile device.

5. The method of claim 1, wherein transmitting, from a mobile device, information including a list identifying applications resident on the mobile device to a policy server includes transmitting, from the mobile device, an application information file to the policy server, the application information file including information identifying applications resident on the mobile device and application usage information identifying previous usage of the applications resident on the mobile device within a predetermined time window.

6. The method of claim 1, wherein transmitting, from a mobile device, information including a list identifying applications resident on the mobile device to a first server includes transmitting, from the mobile device, an application information file to the first server, the application information file including information identifying applications resident on the mobile device and application usage information identifying a previous pattern of usage of the applications resident on the mobile device.

7. The method of claim 1, further comprising:
updating application usage data for one or more of the applications resident on the mobile device based on delivery of the content to the application that transmitted the request for content to the second server.

8. A system stored as a client of a mobile device, the system comprising:
a memory storing non-transitory computer program instructions; and
one or more processors, which, when executing the computer program instructions, cause the one or more processors to become:

an application information module configured to transmit, from the mobile device, information including a list identifying applications resident on the mobile device to a first server;
a content information module configured to receive, from the first server, a manifest file that indicates content items available for retrieval from a second server and associated with one or more of the identified applications, the manifest file including one or more content request templates corresponding to the one or more identified applications, respectively, each of the one or more content request templates being a template of a request by the respective application for content from the second server;
a content retrieval module configured to cause the mobile device to retrieve at least one of the content items available for retrieval from the second server using the one or more content request templates, the at least one content item available for retrieval being available for delivery or pre-delivery from the second server; and
a content delivery module configured to:
access a request for content transmitted from one of the applications resident on the mobile device to the second server;
intercept the accessed request for content;
derive identification information about the requested content from the request for content using the content request template corresponding to the application resident on the mobile device;
compare the identification information about the requested content to content stored in a local cache associated with the mobile device;
determine at least a portion of the content is stored in the local cache; and
cause the mobile device to deliver the at least portion of the content from the local cache to the action that transmitted the request for content to the second server.

9. The system of claim 8, wherein the manifest file includes one or more uniform resource identifiers associated with content located at the second server and available for retrieval by the mobile device; and
wherein the content retrieval module is configured to cause the mobile device to retrieve a content item associated with one of the one or more uniform resource identifiers in the manifest file via a content retrieval protocol identified by the content request template in the manifest file.

10. The system of claim 8, wherein the manifest file includes one or more uniform resource identifiers associated with content feeds located at the second server and available for retrieval by the mobile device; and
wherein the content retrieval module is configured to cause the mobile device to retrieve a content feed associated with one of the one or more uniform resource identifiers in the manifest file via a content retrieval protocol identified by the content request template in the manifest file.

11. The system of claim 8, wherein the content information module is configured to receive the manifest file including one or more uniform resource identifiers associated with content located at the second server and available for retrieval by the mobile device; and
wherein the content retrieval module is configured to cause the mobile device to retrieve a content item associated with one of the one or more uniform resource identifiers in the manifest file.

12. The system of claim 8, wherein the application information module is configured to transmit an application information file to the first server, the application information file including information identifying applications resident on the mobile device and application usage information identifying historical usage of the applications resident on the mobile device.

13. The system of claim 8, wherein the application information module is configured to transmit an application information file to the first server, the application information file including information identifying applications resident on the mobile device and application usage information identifying previous usage of the applications resident on the mobile device within a predetermined time window.

14. The system of claim 8, wherein the application information module is configured to transmit an application information file to the first server, the application information file including information identifying applications resident on the mobile device and application usage information identifying a previous pattern of usage of the applications resident on the mobile device.

15. The system of claim 8, further comprising:
wherein the content delivery module is further configured to:
update application usage data for one or more of the applications resident on the mobile device based on delivery of the content to the application that transmitted the request for content to the second server.

16. A non-transitory computer-readable storage medium whose contents, when executed by a mobile device, cause the mobile device to:
transmit, from the mobile device, information including a list identifying applications resident on the mobile device to a first server;
receive, from the first server, a manifest file that indicates content items available for retrieval from a remote second server and associated with one or more of the identified applications, the manifest file including one or more content request templates corresponding to the one or more identified applications, respectively, each of the one or more content request templates being a template of a request by the respective application for content from the second server;
retrieve at least one of the content items available for retrieval from the remote second server using the one or more content request templates, the at least one content item available for retrieval being available for delivery or pre-delivery from the second server;
access a request for content transmitted from one of the applications resident on the mobile device to the remote second server;
intercept the accessed request for content;
derive identification information about the requested content from the request for content using the content request template corresponding to the application resident on the mobile Device;
compare the identification information about the requested content to content stored in a local cache associated with the mobile device;
determine at least a portion of the content is stored in the local cache; and cause the mobile device to deliver the at least portion of the content from the local cache to the application that transmitted the request for content to the second server.

17. The method of claim 1, wherein the first server is a policy server and the second server is a content server.

18. The method of claim 17, wherein the content server includes one or more components of the policy server.

19. The method of claim 1, wherein causing the mobile device to retrieve at least one of the content items available for retrieval from the second server using the one or more content request templates includes causing the mobile device to retrieve the content items over surplus network bandwidth.

* * * * *